(12) United States Patent  
Yoshida

(10) Patent No.: US 6,718,443 B2
(45) Date of Patent: Apr. 6, 2004

(54) SEMICONDUCTOR INTEGRATED CIRCUIT DEVICE AND ELECTRONIC SYSTEM FOR EXECUTING DATA PROCESSING BY USING MEMORY

(75) Inventor: Toyohiko Yoshida, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 95 days.

(21) Appl. No.: 09/811,574

(22) Filed: Mar. 20, 2001

(65) Prior Publication Data

US 2002/0007436 A1 Jan. 17, 2002

(30) Foreign Application Priority Data

Jul. 12, 2000 (JP) .................................. 2000-211297

(51) Int. Cl.[7] .............................................. G06F 12/00
(52) U.S. Cl. ...................................... 711/147; 711/211
(58) Field of Search ................................ 711/147, 151, 711/211; 709/247; 345/511; 710/68

(56) References Cited

U.S. PATENT DOCUMENTS

| | | | | |
|---|---|---|---|---|
| 5,214,775 A | * | 5/1993 | Yabushita et al. | 711/117 |
| 5,483,497 A | * | 1/1996 | Mochizuki et al. | 365/230.03 |
| 5,497,482 A | * | 3/1996 | Keida et al. | 713/400 |
| 5,587,961 A | * | 12/1996 | Wright et al. | 365/233 |
| 5,724,549 A | * | 3/1998 | Selgas et al. | 711/141 |
| 5,986,711 A | * | 11/1999 | Pau | 375/240.18 |
| 6,058,459 A | | 5/2000 | Owen et al. | |
| 6,381,686 B1 | * | 4/2002 | Imamura | 711/203 |

FOREIGN PATENT DOCUMENTS

| | | |
|---|---|---|
| JP | 8-123943 | 5/1996 |
| JP | 10-145739 | 5/1998 |

* cited by examiner

*Primary Examiner*—Hiep T. Nguyen
(74) *Attorney, Agent, or Firm*—McDermott, Will & Emery

(57) ABSTRACT

A semiconductor circuit device (encoder) is provided with: a functional block for carrying out an encoding process and for generating a first access signal for accessing a memory; a slave IF terminal for receiving a second access signal; and a first selector having a first connection mode for electrically connecting the functional block and the memory so as to supply the first access signal to the memory and a second connection mode for electrically connecting the slave IF terminal and the memory so as to supply the second access signal to the memory. Each of the first and second access signals has an address signal for specifying a storing position in the memory and a control signal for controlling the operation of the memory.

7 Claims, 10 Drawing Sheets

SEMICONDUCTOR INTEGRATED CIRCUIT DEVICE AND ELECTRONIC SYSTEM FOR EXECUTING DATA PROCESSING BY USING MEMORY

BACKGROUND OF THE INVENTION

1. Field of the Invention

The present invention relates to a semiconductor integrated circuit device which can share a memory with another device.

The present invention also concerns an electronic system having a plurality of functional circuits which are operated while being switched in terms of time and each of which processes data while accessing the memory.

2. Description of the Background Art

Referring to FIG. 10, an explanation will be given of the outline of a conventional DVD recorder system (DVD: Digital Versatile Disc or Digital Video Disc). Upon recording moving pictures, an encoder 1 carries out an encoding process in which inputted video data is compressed, for example, in conformity with the MPEG2 Moving Picture Experts Group phase 2) standard. The resulting compressed data is recorded in a DVD 2 that serves as a recording medium. Upon reproducing the moving pictures, a decoder 3 carries out a decoding process in which the compressed data, inputted from the DVD 2, is decompressed in conformity with the MPEG2 standard. Thus, the moving pictures are reproduced on a display based upon the video data outputted from the decoder 3.

Dedicated memories 4 and 5 are respectively connected to the encoder 1 and the decoder 3. In order to process video data on the MPEG2 standard, a memory of not less than 64 M bits is required at the time of encoding, and that of not less than 32 M bits is required at the time of decoding; that is, a large-capacity memory is required. Here, a memory 4 is constituted by four SDRAMs (Synchronous Dynamic Random Access Memory), each having, for example, 16 M bits, and a memory 5 is constituted by two SDRAMs, each having 16 M bits.

In this arrangement, upon recording and upon reproducing, only either of the corresponding encoder 1 and decoder 3 is operated and only the memory connected to the operated side is accessed. Consequently, even though only four of the SDRAMs are operated at one time in the maximum, six SDRAMs are used. Such an inefficient application of the memories causes an increase in the system costs.

SUMMARY OF THE INVENTION

Therefore, one of objectives of the present invention is to provide a semiconductor integrated circuit device which can share a memory with an external device.

Another objective of the present invention is to provide an electronic system in which a plurality of functional circuits that respectively carry out predetermined data processing are allowed to access a shared memory.

In one preferred mode of semiconductor circuit device of the present invention, a first selector, which selectively outputs a first access signal outputted from a functional block for executing a predetermined data processing and a second access signal received by an external interface terminal, is installed. The access signal selected by the first selector is given to a memory so as to access the memory.

A first external device for generating the second access signal is connected to the external interface terminal. The semiconductor integrated circuit and the first external device can access the shared memory so that it is possible to efficiently use the memory.

The semiconductor integrated circuit is further provided with a second selector for selectively making a judgment as to whether the functional block is connected to the external interface terminal or the first selector is connected to the external interface terminal. In the case when the semiconductor integrated circuit is allowed to use the memory, a signal can be transferred between the functional block and the external interface terminal, while in the case when another device is allowed to use the memory, one portion or all the portions of the second access signal is given to the memory from the external interface terminal through the two selectors. Therefore, the external interface terminal is sharedly used as the terminal for transferring a signal between the semiconductor integrated circuit and its external device and also as the terminal for receiving one portion or all the portions of the second access signal; thus, it is possible to reduce the number of terminals.

Here, it is preferable to construct the semiconductor integrated circuit by a single semiconductor chip having a built-in memory. Thus, the number of semiconductor chips through which the second access signal is transferred from the first external device to the memory is reduced; therefore, it is possible to shorten the accessing time to the first external device.

Moreover, in the case when an attempt is made so as to access another memory, this semiconductor integrated circuit is further provided with a third selector that selectively outputs a third access signal received by another external interface terminal and a fourth access signal generated in a functional block.

The second external device is connected to this external interface terminal, and the third access signal is given by the second external device. Therefore, the semiconductor integrated circuit and the second external device are allowed to access the common memory.

Here, the first and the second external devices may be provided as the same device (for example, LSI). Moreover, the semiconductor integrated circuit may be constituted by a single semiconductor chip in which the two memories are built.

More specifically, the functional block in the semiconductor integrated circuit executes an encoding process of data, and a device for executing a decoding process of data is connected to the external interface terminal. More preferably, the functional block is a circuit for carrying out a compressing process of video image data based upon MPEG, and the device connected to the external interface terminal carries out a decompressing process of the image data based upon MPEG.

Another preferred mode of the electronic system of the present invention is provided with a memory for storing data, a first functional block, formed on a single semiconductor chip, for carrying out a first data processing and for generating a first access signal used for accessing the memory; a second functional block, formed on another semiconductor chip, for carrying out a second data processing and for generating a second access signal used for accessing the memory; and a first selector for selectively applying to the memory the first access signal outputted from the first functional block and the second access signal outputted from the second functional block. Since the first and second functional blocks are allowed to access the common memory, the memory can be used efficiently.

Here, in the case when the first selector is formed on the same semiconductor chip as the first functional block, a second selector, which selectively makes a judgment as to whether a certain signal line is connected to the functional block or the signal line is electrically connected to the first selector, is preferably installed on the same semiconductor chip. The signal line is connected to the second and third functional blocks. The third functional block, which is formed on a semiconductor chip that is different from the first and second functional blocks, carries out a third processing while the first functional block is carrying out the first data processing, and transfers data between it and the first functional block.

The second selector transfers a signal between the first and the third functional blocks when the first functional block is allowed to use the memory, and supplies one portion or all the portions of the second access signal to the first selector when the second functional block is allowed to use the memory. Here, a commonly-used terminal that serves as the terminal for transferring data between the first and second functional blocks and that also serves as the terminal for receiving the second access signal from the second functional block can be formed on the semiconductor chip; therefore, it is possible to reduce the number of the terminals.

Moreover, it is preferable to construct the first functional block and the memory on the same semiconductor chip. Since the number of the semiconductor chips through which the second access signal passes through before being supplied to the memory from the second functional block is reduced; therefore, it is possible to shorten the access time from the second functional block to the memory.

Furthermore, the first functional block is an encoder circuit for executing a data compressing process, and the second functional block is a decoder circuit for executing a data decompressing process. More preferably, the first functional block executes a compressing process of video image data based upon MPEG and the second functional block executes a decompressing process of video image data based upon MPEG.

Additionally, in the semiconductor integrated circuit and the electronic system of the present invention, each of the first and second access signals includes an address signal for specifying a storage position in the memory and a control signal for controlling the operation of the memory. In the case when the memory is an SDRAM, the access signal includes a chip select signal, a low address strove signal, a column address strove signal, a write enable signal, a bank address signal and an address signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
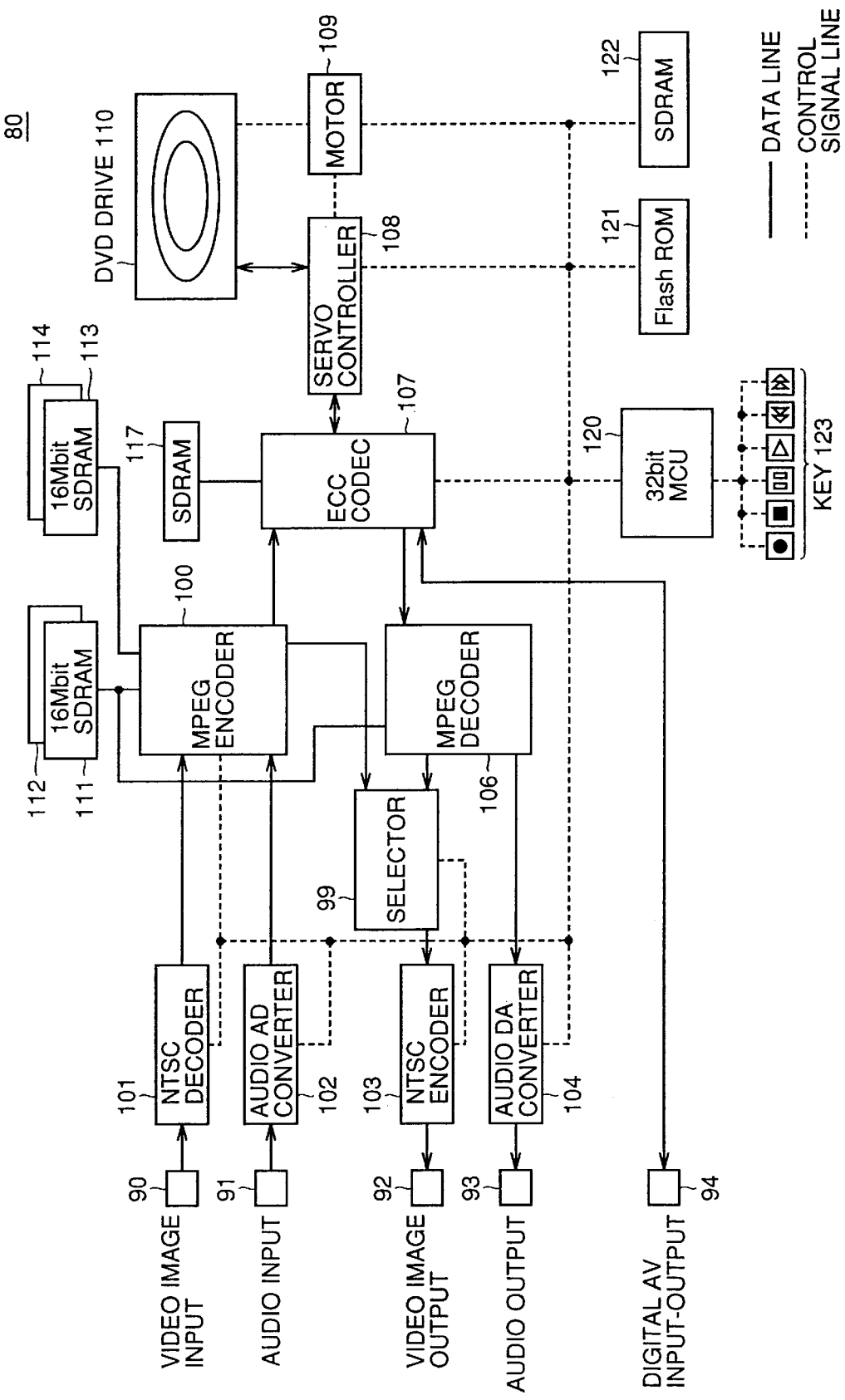
FIG. 1 is a block diagram that shows an arrangement of a DVD recorder device in accordance with a first embodiment of the present invention.

Referring to figures, the following description will discuss embodiments of the present invention. Here, in the figures, the same members or identical members are indicated by the same reference numerals.

First Embodiment

FIG. 1 shows a block diagram of an electronic system in accordance with the first embodiment of the present invention. For example, an explanation will be given of an encoder/decoder device that is provided with an encoder for encoding data based upon a predetermined system and a decoder for decoding encoded data based upon a predetermined system. FIG. 1 shows a DVD recorder device 80 for recording and reproducing audio data and video image data on and from a DVD.

The DVD decoder device 80 includes a selector 99, an MPEG encoder 100, an NTSC decoder 101 (NTSC: National Television System Committee), an audio AD converter 102, an NTSC encoder 103, an audio DA converter 104, an MPEG decoder 106, an ECC codec 107 (ECC: Error Correction Code), a servo controller 108, a motor 109 and a DVD drive 110 that is a recording medium.

Here, in the figures, solid lines indicate data lines for transferring video data, audio data and compressed stream data.

In the case when an original video image and original audio sound are recorded in the DVD drive 110, digital video data that is the original video image of the NTSC system is inputted to the NTSC decoder 101 through a terminal 90, where it is format-converted to digital video data of the ITU-R656 system. Analog audio data that is original audio sound is inputted to the audio AD converter 102 through a terminal 91, where it is converted to digital audio data.

The MPEG encoder 100 executes an encoding process. The MPEG encoder 100, which has received the digital video data from the NTSC decoder 101, compresses the video data based upon an encoding system in conformity with the MPEG2 standard, and upon receipt of the digital audio data from the audio AD converter 102, compresses the audio data based upon an encoding system in conformity with the dolby digital standard. The MPEG encoder 100 multiplexes the video data (video stream) as compressed and the audio data (audio stream) as compressed on one stream data, and outputs the stream data.

In order to prevent errors at the time of recording data on a DVD, the ECC codec 107 carries out a coding process for adding error detecting data to the stream data outputted from the MPEG encoder 100 by using error correction codes. The servo controller 108 carries out a servo controlling process on the DVD drive 110. In particular, while controlling the motor 109 for driving the DVD drive 110, the servo controller 108 transfers data as coded outputted from the ECC codec 107 to the DVD drive 110. The DVD drive 110 records the data thus transferred from the servo controller 108.

When a video image and audio sound are reproduced from the DVD drive 110, the servo controller 108 receives data recorded in the DVD drive 110 while controlling the motor 109, and transfers the data to the ECC codec 107. Based upon error-detection-use data added to the data, the ECC codec 107 corrects errors occurring at the time of recording the data. The MPEG decoder 106 executes a decoding process, and in particular, separates the corrected data received from the ECC codec 107 into video image data and audio data. Thus, the MPEG decoder 106 decompresses the separated video image data based upon a decoding system in conformity with the MPEG2 standard, and further decompresses the separated audio data in a decoding system in conformity with the dolby digital standard.

The NTSC encoder 103 format-converts the digital video image data of the ITU-R656 system outputted from the MPEG decoder 106 to digital video image data of the NTSC system. The converted video image data is outputted through a terminal 92 so that the video image of the NTSC system is reproduced. Moreover, the audio DA converter 104 converts the digital audio data outputted from the MPEG decoder 106 to analog audio data. The analog audio data is outputted through a terminal 93 so that the audio sound is reproduced.

The DVD recorder device 80 allows digital audio video image data to be directly inputted to the ECC codec 107 through a terminal 94. The digital audio video image data, inputted through the terminal 94, is coded for error correction, and then recorded in the DVD drive 110. Then, the DVD recorder device 80 allows the ECC codec 107 to carry out error correction on the recorded audio video image data, and then outputs the resulting data to the terminal 94.

Moreover, the DVD recorder device 80 has such a function that, while recording video image data in the DVD drive 110, it can monitor the video image. In the encoding process in conformity with the MPEG2 standard, the video image data, once compressed, needs to be decompressed; therefore, the MPEG encoder 100 is allowed to output the decompressed video image data. Upon recording, the selector 99 selects the video image data after the decompression that is outputted from the MPEG encoder 100, and outputs the resulting data to the NTSC encoder 103. Moreover, upon reproduction, the selector 99 selects the video image data after the decompression that is outputted from the MPEG decoder 106, and outputs the resulting data to the NTSC encoder 103.

The DVD recorder device 80 is further provided with a control device for controlling the entire device, a memory for storing data required for the controlling operation, and keys 123 operated by the user. The control device is, for example, a microcomputer (hereinafter, referred to as MCU) 120 with 32 bits. Here, the memory includes a non-volatile memory (Flash ROM) 121, such as a flash memory, and a SDRAM 122.

In the figure, dotted lines represent control lines through which the MPU 120 transmits and receives control signals to and from units 99 to 109, 121 and 122. The MCU 120 is allowed to carry out a predetermined control operation through key 123 inputs by the user.

The MPEG encoder 100 and the MPEG decoder 106 are operated for respectively different periods of time. The MCU 120 carries out controlling operations so as to switch the operations of the MPEG encoder 100 and the MPEG decoder 106 in terms of time. In other words, upon recording in the DVD drive 110, the MCU 120 controls the MPEG encoder 100 to execute MPEG-encoding process as well as controlling the MPEG decoder 106 to stop the decoding process. Upon reproduction from the DVD drive 110, it controls the MPEG decoder 106 to execute the decoding process as well as controlling the MPEG encoder 100 to execute the encoding process. Moreover, the MCU 120 also controls the selection operation of the selector 99.

All the units 99 to 108 and 111 to 122 except the DVD drive 110 and the motor 109 are constituted by semiconductor integrated circuit devices (LSI devices) that are respectively formed by individual semiconductor chips.

The DVD recorder device 80 is provided with memories 111 to 114 and 117. Each of the memories 111 to 114 is, for example, a SDRAM of 16 M bits. The memories 111 to 114 are connected to the MPEG encoder 100. The memories 111 to 114 are used for the encoding process of the MPEG encoder 100. On the other hand, the MPEG decoder 106 is connected to one portion (in this case, memories 111 and 112) of the memories 111 to 114. The memories 111 and 112 can be used for the decoding process of the MPEG decoder 106.

Moreover, the memory 117 (in this case, SDRAM) is connected to the ECC codec 107 so as to serve as a memory required for the error correction process.

In particular, each of the memories 111 to 114 are general-purpose DRAMs "M5M4V16S40CTP10" made by Mitsubishi Electric Corporation.

Figure 2:
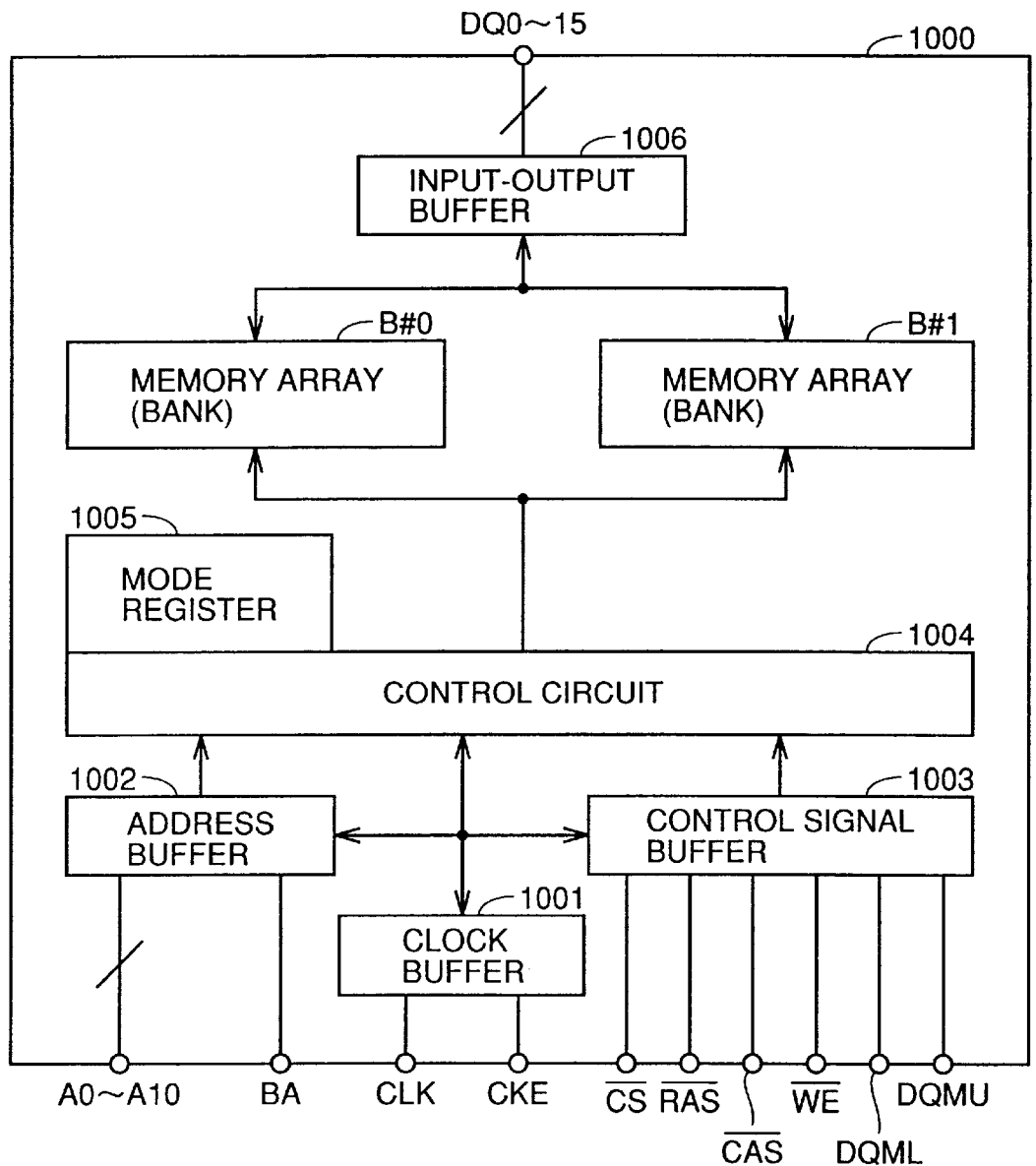
FIG. 2 is a block diagram that shows an arrangement of a memory that is used in the DVD recorder device of FIG. 1.

FIG. 2 shows a schematic construction of the SDRAM. The SDRAM 1000, which contains a plurality of memory cells that are arranged in a matrix format, is provided with banks B#0 and B#1 in and from which writing and reading operations are independently carried out. Data is held in the respective banks.

The SDRAM 1000 has 36 terminals, such as DQ0 to DQ15, terminals A0 to A10, and BA, /CS, /RAS, /CAS, /WE, DQML, DQMU, CLK and CKE.

The terminal CLK is used for inputting a master clock signal (CLK signal) from outside.

The terminal CKE is used for inputting a clock enable signal (CKE signal) from outside.

The terminal /CS is used for inputting a chip select signal (/CS signal) from outside.

The terminal /RAS is used for inputting a row address strobe signal (/RAS) from outside.

The terminal /CAS is used for inputting a column address strobe signal (/CAS) from outside.

The terminal /WE is used for inputting a write enable signal (/WE signal) from outside.

The terminals A0 to A10 are used for inputting address signals of 11 bits (A0 to A10 signals) from outside.

The terminal BA is used for inputting a bank address signal (BA signal) from outside.

The terminals DQ0 to DQ15 are used for inputting and outputting data D0 to D15 of 16 bits in and from the memory cells so as to be written and read.

The terminal DQML is used for inputting a DQML signal from outside.

The terminal DQMU is used for inputting a DQMU signal from outside.

The SDRAM 1000 is further provided with: a clock buffer 1001 for acquiring the CLK signal and CKE signal; an address buffer 1002 for acquiring the A0 to A10 signals and BA signal in accordance with the output of the clock buffer 1001; a control signal buffer 1003 for acquiring the /CS signal, /RAS signal, /CAS signal, /WE signal, DQML signal and DQMU signal in accordance with the output of the clock buffer 1001; the control circuit 1004 for controlling the banks; a mode resister 1005; and a data input-output buffer 1006 that is placed between the banks and data input-output terminals DQ0 to DQ15.

An explanation will be given of functions of the respective signals.

The CLK signal is a synchronous clock signal that forms the basis of the SDRAM 1000, and the other signals become effective based upon the rising edge of the CLK signal to H level. The CKE signal, which is a signal for controlling the internal clock generated inside the system based upon the CLK signal, particularly stops the internal clock for the next cycle when the CKE signal goes low. Moreover, the CKE signal is also used at the time of selection between the auto-refresh mode and the self-refresh mode of the SDRAM 1000. In the case of the self-refresh mode, the CKE signal forms an asynchronous input. While the CKE signal is going low, the self-refresh is continued.

The /RAS signal, /CAS signal and /WE signal set various commands for specifying the operations of the SDRAM 1000 depending on the combinations of the respective logical levels. Here, when the /CS signal goes high, any command is made inoperative.

The A0 to A10 signals specify a row address and a column address in the memory cell together with the BA signal. The A0 to A7 signals specify the column address, and the A0 to A10 signals specify the row address. In particular, when the A10 signal goes high in a read command and a write command, which will be described later, auto-pre-charging is executed so that when the A10 signal goes high in a pre-charge command which will be described later, both of the banks B#0 and B#1 are made inactive, and precharged.

The BA signal specifies a bank to which the command is applied between the banks B#0 and B#1.

When the DQML signal goes high in a burst write mode, lower 8 bits D0 to D7 of 16-bit data to be inputted are masked in the on-going cycle. Moreover, when the DQML signal goes high in a burst read mode, lower 8 bits D0 to D7 of 16-bit data to be outputted during the second cycle is disabled.

When the DQMU signal goes high in a burst write mode, higher 8 bits D8 to D15 of 16-bit data to be inputted are masked in the on-going cycle. Moreover, when the DQMU signal goes high in a burst read mode, higher 8 bits D8 to D15 of 16-bit data to be outputted during the second cycle is disabled.

The /RAS signal, /CAS signal and WE signals specify respective commands, "activate", "read", "write", "pre-charge" and "auto-refresh", as basic commands. The activate command activates a row within the inactive bank specified by the BA signal. The read command specifies the burst read mode from the active bank specified by the BA signal. The write command specifies the burst write mode to the active bank specified by the BA signal. The pre-charge command specifies that the active bank specified by the BA signal be made inactive. This command also stops the operations of the burst read and burst write. The auto-refresh command specifies that an auto-refresh cycle be started. In this case, a refresh address including a bank address is generated in the inside of the memory.

Based upon the respective signals inputted through the address buffer 1002 and the control signal buffer 1003, the control circuit 1004 controls the bank operation so as to realize the above-mentioned functions. The mode register 1005 specifies the burst length, the burst type and the CAS latency at the time of read and write. The contents of the mode register are set by the signals A0 to A9.

In accordance with the control of the control circuit 1004, the banks B#0 and B#1 input and output data to and from the terminals DQ0 to DQ15 through the input-output buffer 1006.

Figure 3:
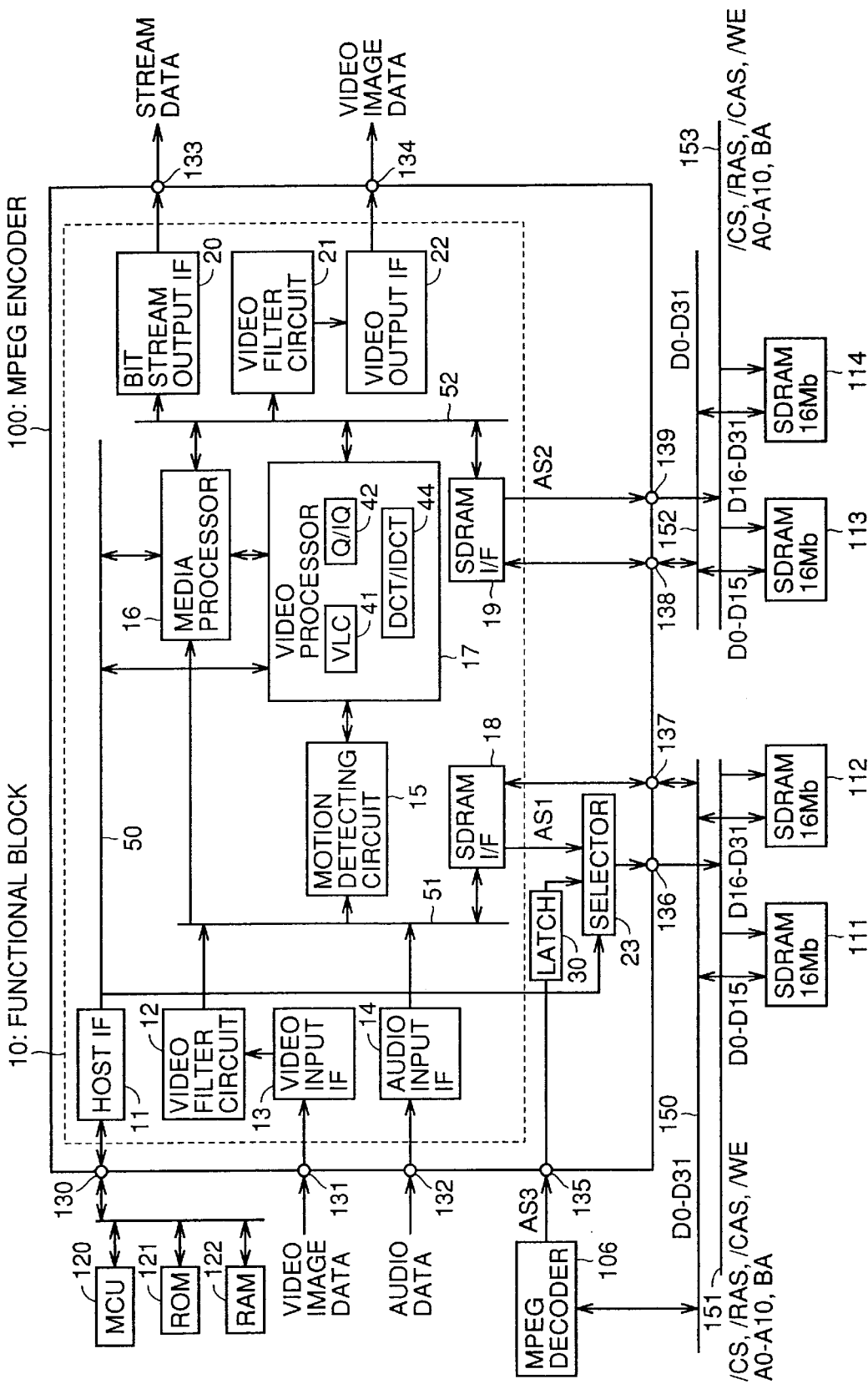
FIG. 3 is a block diagram that shows a detailed arrangement of an MPEG encoder in accordance with the first embodiment.

Referring to FIG. 3, the following description will discuss the construction of the MPEG encoder 100 in detail and the connecting relationship among the MPEG encoder 100, the MPEG decoder 106, the four SDRAMs 111 to 114, the MCU 120 and the memories 121 to 122.

The MPEG encoder 100, which is constituted by a single semiconductor chip, includes a functional block 10, a selector 23 and a latch 30. The functional block 10 executes a compressing process of video image data and audio data, while accessing the SDRAMs 111 to 114. The functional block 10 generates an access signal AS1 for accessing the SDRAMs 111 and 112, and also generates an access signal AS2 for accessing the SDRAMs 113 and 114. Hereinafter, the SDRAMs 111 to 114 are referred to as memories 111 to 114.

The MPEG encoder 100 is provided with a slave interface terminal (referred to as slave IF terminal) 135, master interface terminals (referred to as master IF terminal) 136 and 139, and data input-output terminals 137 and 138. The slave IF terminal 135 receives the access signal AS3 for accessing the memories 111 and 112.

The selector 23 is provided with a first connection mode in which the functional block 10 and the master IF terminal 136 are electrically connected, with the slave IF terminal 135 and the master IF terminal 136 being simultaneously insulated electrically, and a second connection mode in which the slave IF terminal 135 and the master IF terminal 136 are electrically connected, with the functional block 10 and the master IF terminal 136 being simultaneously insulated electrically. The selector 23 selects the access signal AS1 outputted from the functional block 10 in the first connection mode, and supplies it to the master IF terminal 136, and also selects the access signal AS3 received through the slave IF terminal 135 in the second connection mode, and supplies it to the master IF terminal 136.

The functional block 10 is, on the other hand, directly connected to the master IF terminal 139 so as to allow the access signal AS2 to be externally outputted through the master IF terminal.

The latch 30, which is connected between the slave IF terminal 135 and the selector 23, temporarily holds the access signal AS3 outputted from the slave IF terminal 135. The latch 30 allows the access signal AS3 to be delayed by one cycle from the cycle at the time of being received by the slave IF terminal 135, and outputs the resulting value of the access signal AS3 to the selector 23.

Here, each of the access signals AS1, AS2 and AS3 is a signal having a plurality of bit widths. Each of the master IF terminals 137 and 139 have a plurality of connection pins for outputting the respective bits of the access signal. Moreover, the slave IF terminal 135 also has a plurality of connection pins for receiving the respective bits of the access signal.

In the present embodiment, each access signal contains an address signal for specifying a memory address and a control signal for controlling the operation of the memory.

The access signal is a signal with 16 bits, and an address signal consists of A0 to A10 signals indicated by 11-bit signals of the access signal, and these signals are inputted to the respective memory terminals A0 to A11. On the other hand, the control signals include the /CS signal, /RAS signal, /CAS signal, /WE signal and BA signal that are indicated by the rest 5 bits of the access signal, and these signals are respectively inputted to the memory terminals, /CS, /RAS, /CAS, /WE and BS. Therefore, the number of the connection pins of each of the terminals 135, 137 and 139 is 16. Here, the memory terminals DQML and DQMU are fixed to L level.

The master IF terminal 136 is connected to both of the memories 111 and 112 through a control bus 151 with a 16-bit width. The functional block 10 is connected to the data bus 150 with a 32-bit width through the data input-output terminal 137. Thus, the data input-output terminal 137 has 32 connection pins. Each of the memories 111 and 112 inputs and outputs data with a 16-bit width, and the 16 of the higher order on the data bus 150 is connected to the memory 111, with the 16 of the lower order being connected to the memory 112.

The access signal selected by the selector 23 of the access signals AS1 and AS2 is simultaneously supplied to the memories 111 and 112 from the master IF terminal 136. Based upon the selected access signal, the memory 111 outputs the data D0 to D15 of 16 bits that has been held therein to the half bus width of the data bus 150,or receives data D0 to D15 of 16 bits from the half bus width of the data bus 150, and holds the data. Based upon the selected access signal, the memory 112 outputs the data D16 to D31 of 16 bits that has been held therein to the half bus width of the data bus 150,or receives data D16 to D32 of 16 bits from the half bus width of the data bus 150, and holds the data. Therefore, the memories 111 and 112 function as a memory having a 32-bit width as a whole.

In the same manner as described above, the master IF terminal 139 is connected to the memories 113 and 114 through the control bus 153 having a 16-bit width. The functional block 10 is connected to the data bus 152 having a 32-bit width through the data input-output terminal 138. Therefore, the data input-output terminal 138 also has 32 connection pins. Each of the memories 113 and 114 also inputs and outputs data of 16 bits; thus, higher 16 bits of the data bus 152 are connected to the memory 111, and the lower 16 bits are connected to the memory 112.

The access signal AS2 outputted from the functional block 10 is simultaneously supplied to the memories 113 and 114 through the master IF terminal 139. Based upon the access signal AS2, the memory 113 outputs the data D0 to D15 of 16 bits that has been held therein to the half bus width of the data bus 152,or receives data D0 to D15 of 16 bits from the half bus width of the data bus 152, and holds the data. Based upon the access signal AS2, the memory 114 outputs the data D16 to D32 of 16 bits that has been held therein to the half bus width of the data bus 152, or receives data D16 to D32 of 16 bits from the half bus width of the data bus 152, and holds the data. Therefore, the memories 113 and 114 function as a memory having a 32-bit width as a whole.

The functional block 10 for executing the encoding process is provided with a host interface circuit (hereinafter, referred to as host IF) 11, a video filter circuit 12, a video input interface circuit (hereinafter, referred to a video input IF) 13, an audio input interface circuit (hereinafter, referred to as an audio input IF) 14, a motion detecting circuit 15, a media processor 16, a video processor 17, memory interface circuits (hereinafter, referred to as memories IF) 18 and 19, a bit stream output interface circuit (hereinafter, referred to as a bit stream output IF) 20, a video filter circuit 21 and a video output interface circuit (hereinafter, referred to as a video output IF) 22.

The memory IF 18, which is connected to the selector 23 and the data input-output terminal 137, outputs the access signal AS1 to the selector 23, and also transmits and receives data of 32 bits between the memories 111 and 112 through the data input-output terminal 137.

The memory IF 19, which is connected to the data input-output terminal 138 and the master IF terminal 139, outputs the access signal AS2 to the master IF terminal 139, and also transmits and receives data of 32 bits between the memories 113 and 114.

The host IF 11, which is connected to the MCU 120, ROM 121 and RAM 122 through the terminal 130, is also connected to the media processor 16 and the video processor 17 through the bus 50. The host IF 11 transmits and receives data between the MCU 120, ROM 121 or RAM 122 and the media processor 16 or the video processor 17.

The video processor 17 includes a VLC circuit 41, a Q/IQ circuit 42 and a DCT/IDCT circuit 44.

The MPEG decoder 106 is a functional block that executes a decoding process for decompressing video image data and audio data, and that generates the access signal AS3 upon carrying out the decoding process. The MPEG decoder 106 is connected to the IF terminal 135, and the access signal AS3 is supplied to the slave IF terminal 135. Moreover, the MPEG decoder 106 is connected to the data bus 150 so that it transfers data to and from the memories 111 and 112.

Upon recording video image data, the selector 23 selects a first selection mode for connecting the memory IF 18 and the master IF terminal 136. Thus, the access signal AS1 outputted from the memory IF 18 is selected by the selector 23, and supplied to the memories 111 and 112 through the master IF terminal 136. The functional block 10 is allowed to write data in the memories 111 and 112 through the master IF terminal 137 or to read data from the memories 111 and 112.

Upon reproducing video image data, the selector 23 selects a second selection mode for connecting the slave IF terminal 135 and the master IF terminal 136. Thus, the access signal AS3 generated by the MPEG decoder 106 is selected by the selector 23, and supplied to the memories 111 and 112 through the master IF terminal 136. The MPEG decoder 106 is allowed to write data in the memories 111 and 112 through the data bus 150 or to read data from the memories 111 and 112. In other words, the decoder 106 is allowed to access the memories 111 and 112 as memories with 524288 words×32 bits.

The switching of the connection mode of the selector 23 is controlled by the MCU 120. The selector 23 carries out selection of the selection mode in accordance with the selection control signal transferred from the bus 50.

The access signal AS3, outputted from the MPEG decoder 106, is supplied to the memories 111 and 112 with a delay of one clock cycle from the cycle outputted from the MPEG decoder 106 that is made by the latch 30. The latch 30 allows the access signal AS3 to be delayed by one clock cycle as described above so as to compensate the input of the access signal AS3 to the memories 111 and 112 for its synchronization with the CLK signal. Data transfer between the MPEG decoder 106 and the memories 111 and 112 is directly executed by the data bus 150 located outside. The CAS latency with respect to the MPEG decoder 106 is set to be greater than the CAS latency set in the mode register of the memories 111 and 112 by one clock cycle. Therefore, in order to obtain the CAS latency required for the decoder 106, the CAS latency that is faster by one clock cycle is set in the mode register of the memories 111 and 112. The setting of the mode register of the memories 111 and 112 can be changed by the media processor 16.

As described above, since the selector 23 is installed in the MPEG encoder 100 so that the MPEG encoder 100 and the MPEG decoder 106 are allowed to access the memories 111 and 112 at the time of the respective operations. In other words, the MPEG encoder 100 and the MPEG decoder 106 can share the memories 111 and 112 by using them in a shared manner in terms of time. Thus, it is possible to use the memory efficiently.

The following description will discuss some preferable modified examples.

(1) The selector 23 is constituted by a semiconductor chip different from the MPEG encoder 100 and the MPEG decoder 106; thus, even when the selector 23 is designed to receive the access signal AS3 that is transferred without passing through the MPEG encoder 100, the MPEG encoder 100 and the MPEG decoder 106 can access the common memories.

(2) The SDRAMs are adopted as the memories 111 and 112; however, these may be formed by asynchronous DRAMs.

(3) The functional block 10 is formed in conformity with the MPEG2 standard; however, another MPEG standard such as MPEG4 may be adopted. With respect to the MPEG decoder 106, a decoding system of another MPEG standard may be adopted in accordance with the MPEG encoder 100.

(4) In the case when the input of the access signal AS3 to the memories 111 and 112 is made synchronous to the CLK signal within a permissible range, the latch 30 can be eliminated.

(5) The selector 23 may be built not in the MPEG encoder 100 side, but in the MPEG decoder 106 side. In this case, the access signal outputted from the MPEG encoder 100 is supplied to the selector of the MPEG decoder 106. In this case also, the MPEG encoder 100 and the MPEG decoder 106 are allowed to access the common memories.

Second Embodiment

Figure 4:
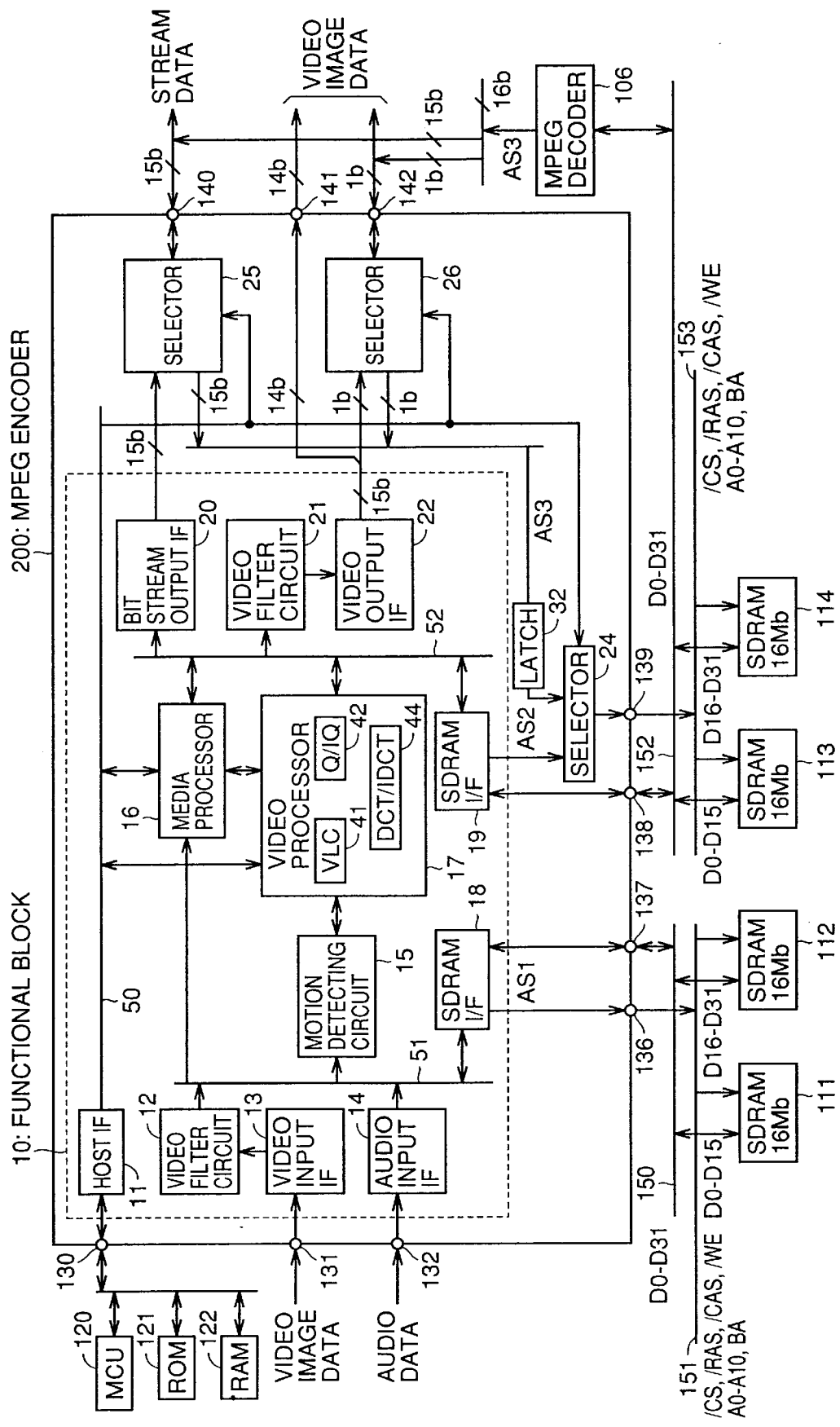
FIG. 4 is a block diagram that shows a detailed arrangement of an MPEG encoder in accordance with a second embodiment of the present invention.

Referring to FIG. 4, the following description will discuss the construction of the MPEG encoder 200 in detail and the connecting relationship with the MPEG decoder 106.

In the MPEG encoder 200, the access signal AS1 is directly supplied to the master IF terminal 136 so that the slave IF terminal 135 and the selector 23 shown in FIG. 3 are eliminated. The MPEG encoder 200 is provided with selectors 24 to 26 and a latch 32, and instead of the data output terminals 133 and 134 of FIG. 3, terminals 140 to 142 are installed.

The MPEG decoder 106 is connected to the terminals 142 and 140. One portion of bits of the access signal AS3 outputted from the MPEG decoder 106 is supplied to the terminal 140 and the rest of bits are supplied to the terminal 142. Thus, the MPEG decoder 106 is connected not to the data bus 150, but to the data bus 152, so that data write and readout operations are carried out to and from the memories 113 and 114. The arrangements other than those described above are the same as those in the DVD recorder device of the first embodiment and the MPEG encoder 100 used therein.

The following description will exemplify a case in which both of stream data and video image data have a 15-bit width, and are respectively outputted from a bit stream IF 20 and a video output IF 22.

The selector 25 is provided with a first connection mode in which the bit stream IF 20 and the terminal 140 are electrically connected, with the selector 24 and the terminal 140 being simultaneously insulated electrically, and a second connection mode in which the selector 24 and the terminal 140 are electrically connected, with the bit stream IF 20 and the terminal 140 being simultaneously insulated electrically. Therefore, in the case of the first connection mode, the selector 25 outputs 15-bit stream data outputted from the bit stream IF 20 to the terminal 140, and in the case of the second connection mode, it outputs a 15-bit signal received at the terminal 140 of the access signal AS3 to the selector 24.

The selector 26 is provided with a first connection mode in which the video output IF 22 and the terminal 142 are electrically connected, with the selector 24 and the terminal 142 being simultaneously insulated electrically, and a second connection mode in which the selector 24 and the terminal 142 are electrically connected, with the video output IF 22 and the terminal 142 being simultaneously insulated electrically. Thus, in the case of the first connection mode, the selector 26 outputs one bit of the video image data outputted from the video output IF 22 is outputted to the terminal 142, and in the case of the second connection mode, one bit of the signal received at the terminal 142 of the access signal AS3 is outputted to the selector 24. Moreover, the rest 14 bits of the video image data outputted from the video output IF 22 are supplied to the terminal 141.

The selector 24 is provided with a first connection mode in which the functional block 10 and the master IF terminal 139 are electrically connected, with the selectors 25 and 26 and the master IF terminal 139 being simultaneously insulated electrically, and a second connection mode in which the selectors 25 and 26 and the master IF terminal 139 are electrically connected, with the functional block 10 and the master IF terminal 139 being simultaneously insulated electrically.

Upon recording data in the DVD, the selectors 24 to 26 selects the first selection mode, and upon reproducing data from the DVD, it selects the second selection mode. The switching of the selection modes of the selectors 24 to 26 are controlled by the MCU 120 so that the selectors 24 to 26 are allowed to select the selection modes in accordance with instructions from the common selection control signal transferred from the bus 50.

Upon recording data in the DVD, the selector 24 selects the access signal AS2 outputted from the memory IF 19, and outputs it to the master IF terminal 139. Upon reproducing data from the DVD, the selector 24 selects the access signal AS3 outputted from the selectors 25 and 26, and outputs it to the master IF terminal 139. Here, the latch 32 temporarily holds the access signal AS3 outputted from the selectors 25 and 26 so that the latch 32 allows the access signal AS3 to be delayed by one cycle from the cycle at the time of being received by the slave IF terminals 140/142, and outputs the resulting signal to the selector 24. In the same manner as the first embodiment, the latch 32 compensates the input of the access signal AS3 to the memories 113 and 114 for its synchronization with the CLK signal.

In the MPEG encoder 200 as arranged as described above, upon recording data in the DVD, the access signal AS2 outputted from the memory IF 19 is supplied to the memories 113 and 114 through the selector 24 and the slave IF terminal 139. Consequently, the MPEG encoder 200 is allowed to access the memories 113 and 114 so that the functional block 10 writes data in the memories 113 and 114 or reads data from the memories 113 and 114 through the data bus 152. Moreover, the stream data obtained from bit stream IF 20 is outputted from the terminal 140. The video image data obtained from the video output IF 22 is outputted from the terminals 141 and 142. In this case, the MPEG decoder 106 stops its decoding operation, while the terminal of the decoder 106 for outputting the access signal AS3 is maintained in a high-impedance state.

Upon recording data into the DVD, the access signal AS3, outputted from the MPEG decoder 106, is supplied to the memories 113 and 114 through the terminals 141 and 142, the selectors 25, 26 and 24. The MPEG decoder 106 accesses the memories 113 and 114, and writes data in the memories 113 and 114, or reads data from the memories 113 and 114, through the data bus 152.

Here, the CAS latency with respect to the MPEG decoder 106 is greater than the CAS latency set by the mode register of the memories 113 and 114 by one clock cycle. In order to obtain the CAS latency required for the MPEG decoder 106, a CAS latency that is faster by one clock cycle is set in the mode register of the memories 113 and 114. The setting of the mode register of the memories 113 and 114 can be changed by the media processor 16.

As described above, in the second embodiment, the MPEG encoder 200 and the MPEG decoder 106 can share the memories 113 and 114 by using them in a shared manner in terms of time. Thus, it is possible to use the memories 113 and 114 efficiently. Moreover, in the MPEG encoder 200, at the time of the encoding process, the same terminal can be sharedly used as the terminal for externally outputting data and the terminal for receiving the access signal from the MPEG decoder 106, thereby making it possible to reduce the number of terminals.

The following description will discuss some preferable modified examples.

(1) In the MPEG encoder 200, the terminal for inputting data from outside at the time of the encoding process (for example, the terminals 131 and 132) and the terminal for receiving the access signal AS3 from the MPEG decoder 106 may be sharedly used. However, while the MPEG decoder 106 is outputting the access signal AS3, the output terminals of the other devices connected to the shared terminal have to be maintained in a high-impedance state.

(2) In the MPEG encoder 200, among all the connection pins for receiving the access signal AS3 from the MPEG decoder 106, some of the connection pins may be sharedly used as connection pins through which the MPEG encoder 200 inputs or outputs data, and the rest of the connection pins may be used as dedicated terminals as in the case of the first embodiment. For example, in FIG. 4, in the case when only the terminal 140 is used as the shared terminal, the rest one-bit signal of the access signal AS3 is supplied to the selector 24 through the dedicated external terminal not shown. The output of the video filter circuit is directly connected to the terminals 141 and 142, thereby making it possible to eliminate the selector 26.

(3) The selectors 24 to 26 may be built not in the MPEG encoder 200 side, but in the MPEG decoder 106 side. At this time, the access signal outputted from the MPEG encoder 200 is supplied to the selector of the MPEG decoder 106.

Third Embodiment

Figure 5:
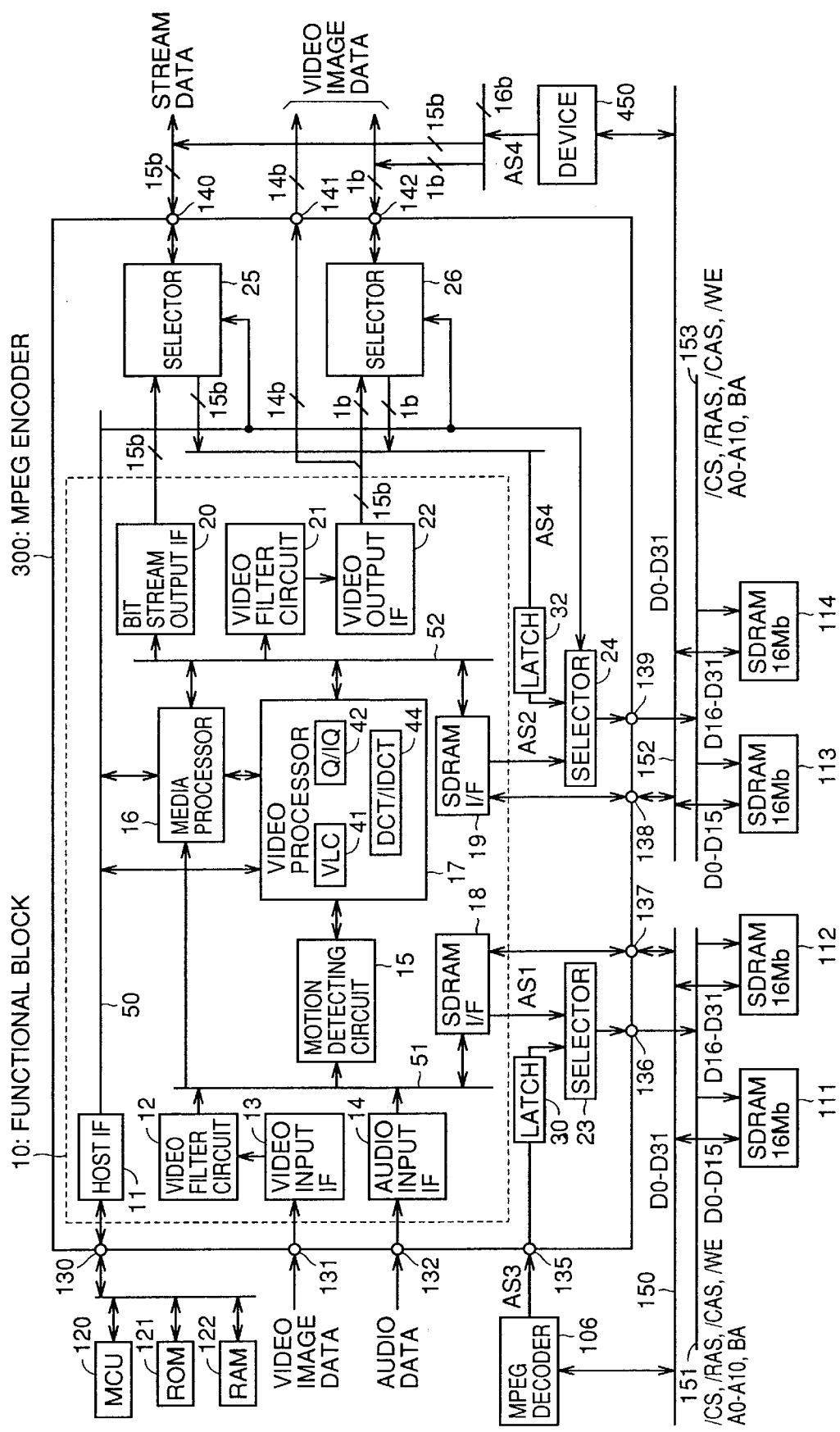
FIG. 5 is a block diagram that shows a detailed arrangement of an MPEG encoder in accordance with a third embodiment of the present invention.

FIG. 5 shows an MPEG encoder 300 in accordance with the third embodiment of the present invention.

This MPEG encoder 300 is provided with the same selectors 24 to 26, a latch 32 and terminals 140 to 142 as in FIG. 4. The other members are the same as those described in the MPEG encoder 100 of the first embodiment.

In the same manner as the first embodiment, the selector 23 switches the connection modes so that the MPEG encoder 300 and the MPEG decoder 106 are allowed to sharedly use the memories 111 and 112 in terms of time; thus, the memories 111 and 112 are shared. Moreover, in the case when a device 450 that becomes operative when the MPEG encoder 300 is not carrying out the encoding process is installed on the electronic system, the device 450 is allowed to use the memories 113 and 114. The device 450 is constituted by a semiconductor chip different from the MPEG decoder 106.

More specifically, the total 16 connection pins of the terminals 140 and 142 are connected to the 16 connection pins of the device 450 for outputting an access signal AS4 for accessing the memories 113 and 114 in one-to-one correspondence with each other. The access signal AS4 consists of address signals of A0 to A10 signals, /CS signal, /RAS signal, /CAS signal, /WE signal and BA signal. The terminal of the device 450 for transferring data between the memories 113 and 114 is connected to the data bus 152. Therefore, in the same manner as the second embodiment, the selectors 24 to 26 switch the connection modes so that the device 450 is allowed to access the memories 113 and 114.

Fourth Embodiment

Figure 6:
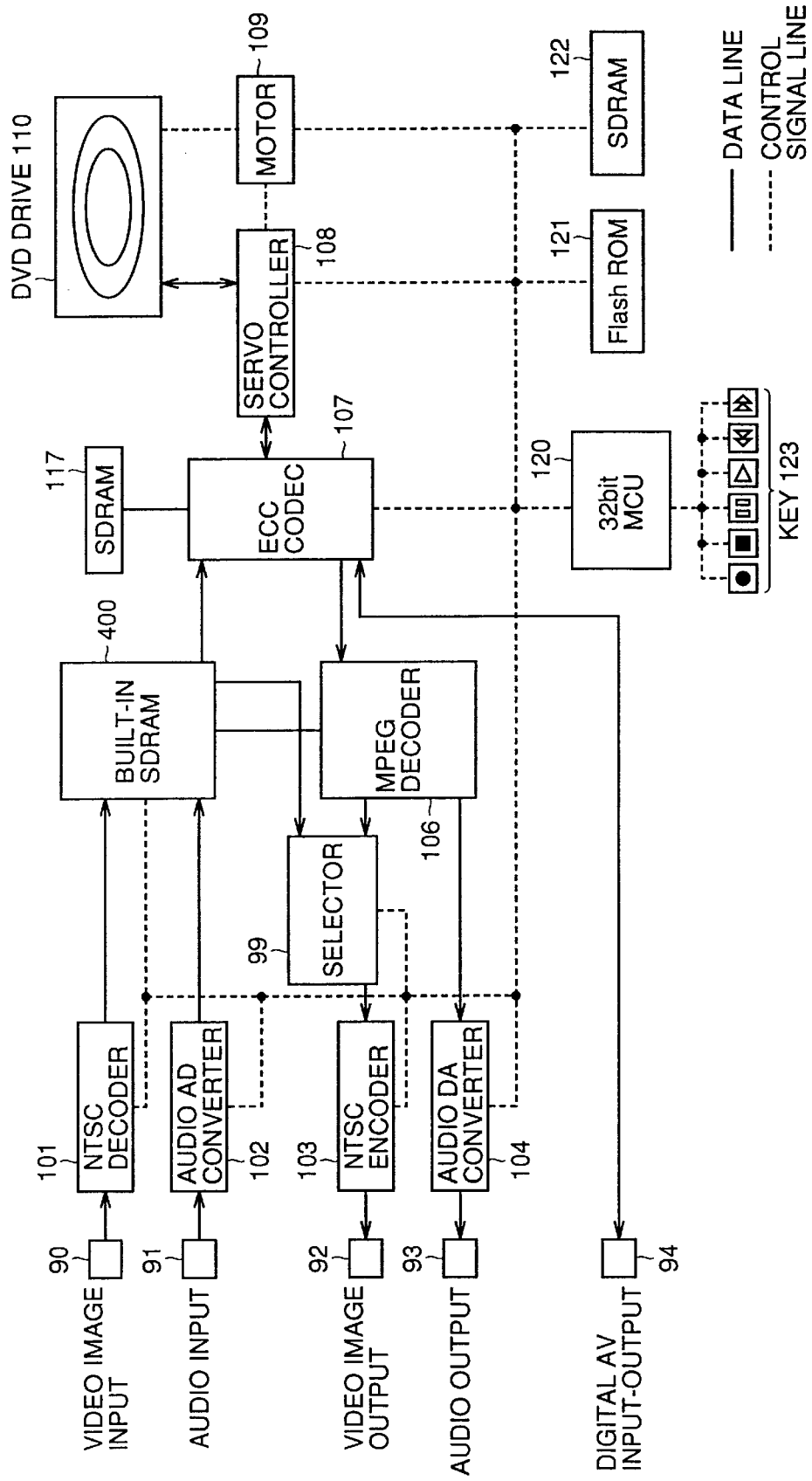
FIG. 6 is a block diagram that shows an arrangement of a DVD decoder device in accordance with a fourth embodiment of the present invention.

FIG. 6 shows the construction of a DVD recorder device in accordance with the fourth embodiment of the present invention.

The fourth embodiment is different from the first embodiment in that the MPEG encoder 400 has a built-in memory for storing data of 64 M bits while the memories 111 to 114 are removed therefrom, and in that the MPEG decoder 106 is allowed to access the built-in memory of the encoder 400, and the other arrangements are the same as those in the first embodiment.

Figure 7:
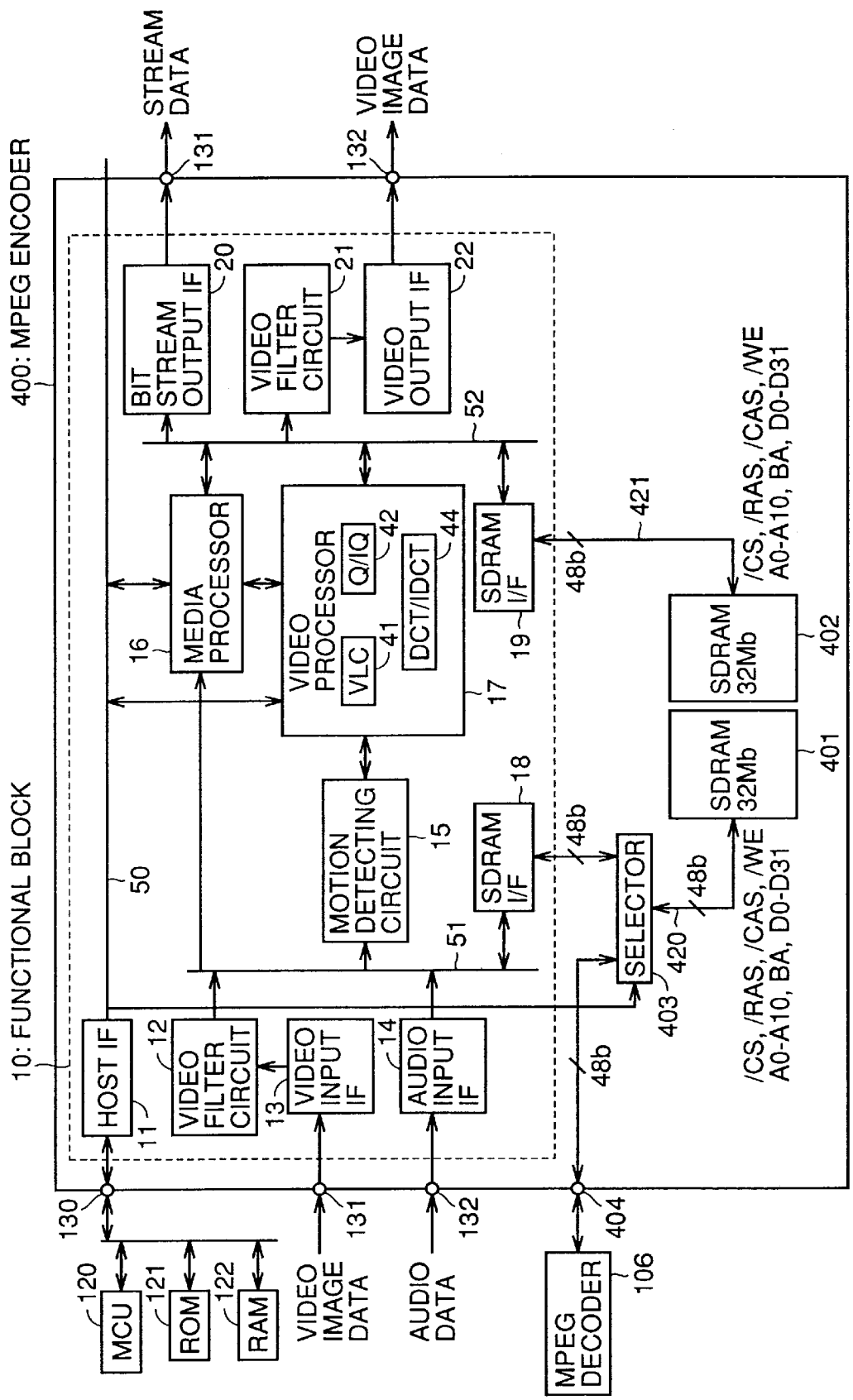
FIG. 7 is a block diagram that shows a detailed arrangement of an MPEG encoder in accordance with a fourth embodiment of the present invention.

FIG. 7 shows a detailed construction of the MPEG encoder 400 and the connecting relationships among the MPEG encoder 400, the MPEG decoder 106, the MCU 120 and the memories 401 and 402. This construction is different from the encoder 100 of the first embodiment in that the MPEG encoder 400 is provided with memories 401 and 402, a slave IF terminal 404 and a selector 403; and the other arrangements are the same as those of the first embodiment.

Each of the memories 401 and 402 is an SDRAM which can store data of 32 M bits, and receives an access signal including the address signals (A0 to A10 signals), /CS signal, /RAS signal, /CAS signal, /WE signal and BA signal, and reads or writes data by using a 32-bit width in accordance with the access signal. The access signal functions in the same manner as that of the SDRAM 1000. The memories 401 and 402 are respectively connected to buses 420 and 421, each of which has a 48-bit width, and is provided with 16 control signal lines for receiving the access signal and 32 data signal lines for inputting and outputting data.

The slave IF terminal 404 is connected to the MPEG decoder 106. The slave IF terminal 404 has 16 connection pins for receiving access signals from the MPEG decoder 106 and 32 connection pins for transmitting and receiving data. Between the slave IF terminal 404 and the selector 403 as well as between the memory IF 18 and the selector 403, connections are made by 16 control signal lines for transferring the access signal and 32 data signal lines for transferring data.

The selector 403 is provided with a first connection mode in which the memory IF 18 and the bus 420 are electrically connected, with the slave IF terminal 404 and the bus 420 being simultaneously insulated electrically, and a second connection mode in which the slave IF terminal 404 and the bus 420 are electrically connected, with the memory IF 18 and the bus 420 being simultaneously insulated electrically.

Upon recording data to the DVD, the selector 403 selects the first connection mode. The access signal AS1 outputted from the memory IF 18 is supplied to the memory 401 through the selector 403 and the control signal line of the bus 420. The memory 401 writes data outputted from the memory IF 18 or outputs data held therein to the memory IF 18, through the data signal line of the bus 420 and the selector 403, in accordance with the access signal AS1.

Upon reproducing data from the DVD, the selector 403 selects the second connection mode. The access signal AS3, outputted from the MPEG decoder 106, is supplied to the memory 401 through the 16 connection pins of the slave IF terminal 404, the selector 403 and the control signal line of the bus 420. The memory 401 writes data outputted from the MPEG decoder 106, or outputs data held therein to the MPEG decoder 106, through the data signal line of the bus 420, the selector 403 and the 32 connection pins of the slave IF terminal 404, in accordance with the access signal AS3. In other words, the decoder 106 is allowed to access the memory 401 as a memory with 524288 words×32 bits.

The switching of the connection mode of the selector 403 is controlled by the MCU 120. The selector 23 carries out selection of the selection mode in accordance with the selection control signal transferred from the bus 50.

The memory IF 19, which is connected to the memory 402 through the bus 421, supplies the access signal AS2 to the memory 402 through the control signal line of the bus 421. The memory 402 transmits and receives data to and from the memory IF 19 through the data signal line of the bus 421 in accordance with the access signal line AS2.

In the MPEG encoder 400 arranged as described above, since the selector 403 selects either the memory IF 18 and the slave IF terminal 403, and connects the resulting one to the memory 401, the MPEG encoder 400 and the MPEG decoder 106 sharedly use the memory 401 in terms of time. Thus, it is possible to use the memory efficiently. Moreover, since the shared memory is built in the MPEG encoder 400 of the single semiconductor chip, the MPEG decoder 106 is allowed to access the memory 401 in the same synchronized timing with the CAS latency set in the mode register of the memory 401.

Fifth Embodiment

Figure 8:
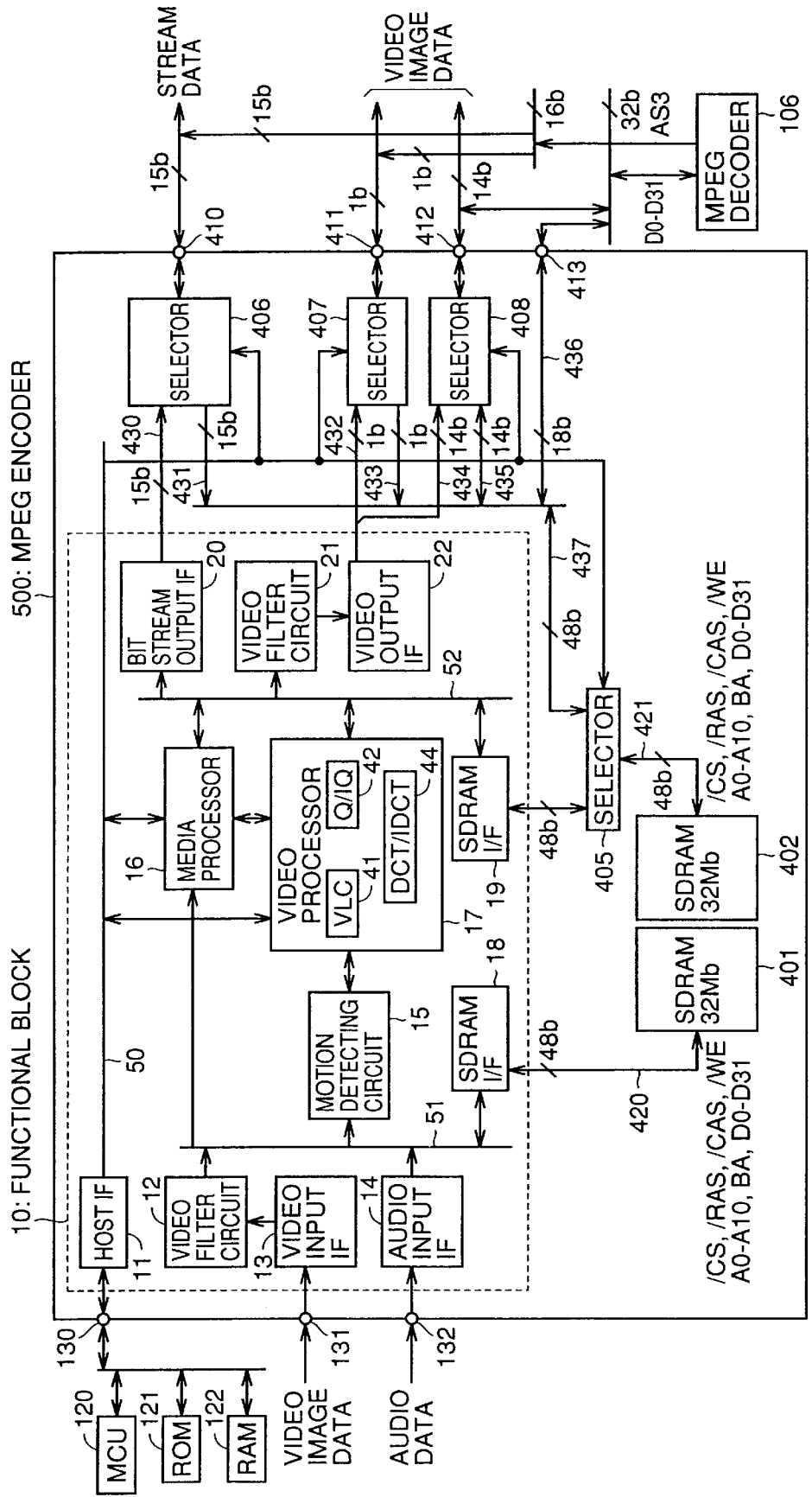
FIG. 8 is a block diagram that shows a detailed arrangement of an MPEG encoder in accordance with a fifth embodiment of the present invention.

FIG. 8 shows a detailed construction of an MPEG encoder 500 in accordance with the fifth embodiment of the present invention and the connecting relationship of the MPEG encoder 500 and the MPEG decoder 106.

In the MPEG encoder 500, the memory IF 18 and the memory 401 are connected to each other through the bus 420 without passing through the selector. The memory IF 18 supplies the access signal AS1 to the memory 401 through the 16 control signal lines of the bus 420. The memory 401 executes data readout and write operations with the memory IF 18 through the 32 data signal lines of the bus 420 in accordance with the access signal AS1.

Moreover, the MPEG encoder 500 is provided with selectors 405 to 408, and is also provided with terminals 410 to 413 in place of the output terminals 133 and 134 of FIG. 7. The MPEG decoder 106 is connected to the input-output terminals 410 to 413. The other arrangements are the same as those discussed in the MPEG encoder 400 of the fourth embodiment.

The following description will exemplify a case in which stream data and video image data respectively have a 15-bit width, and are outputted through a bit stream IF 20 and a video output IF 22 respectively.

The selector 406 is provided with a first connection mode in which the bit stream output IF 20 and the terminal 410 are electrically connected, with the selector 405 and the terminal 410 being simultaneously insulated electrically, and a second connection mode in which the selector 405 and the terminal 410 are electrically connected, with the bit stream output IF 20 and the terminal 410 being simultaneously insulated electrically. The selector 406 is connected to the bit stream output IF 20 and selector 405 respectively through the buses 430 and 431. Each of the buses 430 and 431 has a 15-bit width.

The selector 407 is provided with a first connection mode in which the video output IF 22 and the terminal 411 are electrically connected, with the selector 405 and the terminal 411 being simultaneously insulated electrically, and a second connection mode in which the selector 405 and the terminal 411 are electrically connected, with the video output IF 22 and the terminal 411 being simultaneously insulated electrically. The selector 407 is connected to the video output IF 22 and selector 405 respectively through the buses 432 and 433. Each of the buses 432 and 433 has a one-bit width.

The selector 408 is provided with a first connection mode in which the video output IF 22 and the terminal 412 are electrically connected, with the selector 405 and the terminal 412 being simultaneously insulated electrically, and a second connection mode in which the selector 405 and the terminal 412 are electrically connected, with the video output IF 22 and the terminal 412 being simultaneously insulated electrically. The selector 407 is connected to the video output IF 22 and selector 405 respectively through the buses 434 and 435. Each of the buses 434 and 435 has a 14-bit width.

The terminal 413 is directly connected to the selector 405 through a bus 436. The bus 436 has a 18-bit width.

The selector 405 is provided with a first connection mode in which the bus 421 and the memory IF 19 are electrically connected, with the bus 421 and the bus 437 being simultaneously insulated electrically, and a second connection mode in which the bus 421 and the bus 437 are electrically connected, with the bus 421 and the memory IF 19 being simultaneously insulated electrically. The bus 437 has a 48-bit width, and connected to a bus having a total 48-bit width, constituted by the buses 431, 433 and 435, in one-to-one correspondence with each other.

Upon recording data to the DVD, the selectors 405 to 408 are all allowed to select the first connection mode. The access signal AS2, outputted from the memory IF 19, is supplied to the memory 402 through the selector 405 and the control signal line of the bus 421. The memory 402 writes data outputted from the memory IF 19, or outputs data held therein to the memory IF 19, through the data signal line of the bus 421 and the selector 405, in accordance with the access signal AS2.

Moreover, the stream data, outputted from the bit stream output IF 20, is transferred to the ECC codec 107 through the bus 430, selector 406 and the terminal 410. A signal corresponding to one bit of the signal of the video image data outputted from the video output IF 22 is outputted from the terminal 411 through the bus 432, the selector 407, and a signal corresponding to the rest 14 bits of the signal is outputted from the terminal 412 through the bus 434 and the selector 408. The signals of 15 bits outputted from the terminals 411 and 412 are transferred to the selector 99.

In this case, the MPEG decoder 106 stops its decoding operation, while all the terminals of the MPEG decoder 106 connected to the terminals 410 to 413 are maintained in a high-impedance state.

Upon reproducing data from the DVD, the selectors 405 to 408 are allowed to select the second connection mode. At this time, the terminals 410 to 413 consisting of a total of 48 connection pins are electrically connected to the bus 421 having a 48-bit width through the buses 431, 433, 435 and 436.

All the connection pins of the terminals 410 and 411 receive the access signal AS3 outputted from the MPEG decoder 106. The access signal AS3 is supplied to the memory 402 through the selectors 406, 407 and 405 and the 16 control signal lines of the bus 421. In accordance with the access signal AS3 thus received, the memory 402 writes data outputted from the MPEG decoder 106, or outputs the data held therein to the MPEG decoder 106, through the 32 data signal lines of the bus 421, the selector 405, the selector 408 and all the connection pins of the terminals 412 and 413.

The switching between the respective connection modes of the selectors 405 to 408 is controlled by the MCU 120, and the selectors 405 to 408 are allowed to select the connection mode based upon instructions given by a common selection signal transferred from the bus 50.

Here, the access signal AS3 is associated with the terminals 410 and the data D0–31 are associated with the terminals 412 and 413; however, the present invention is not intended to be limited thereby. Among the total of 48 signals of data D0–D31 in the access signal AS3, arbitrary 18 signals may be associated with the terminal 413 that is a dedicated terminal, and the rest 30 signals may be associated with the terminals 410 to 412 that are shared terminals. Here, it is necessary to make an arrangement so that predetermined signals are properly transferred to the bus 421 connected to the memory 402.

Moreover, one or a plurality of selectors that are the same as the selectors 406 to 408 may be further installed so that the terminal (for example, terminals 131 and 132) used for inputting data from outside at the time of the encoding operation of the MPEG encoder 200 may be sharedly used as the terminal that is connected to the MPEG decoder 106. Thus, one portion or all the portions of the data signal corresponding to 18 bits, transferred through the terminal 413 in FIG. 8, can be inputted or outputted to or from the memory 402 through the terminals 131 and 132.

However, the output terminals of the other devices connected to the shared terminal have to be maintained in a high-impedance state.

As described above, in accordance with the fifth embodiment, in the MPEG encoder 500 and MPEG decoder 106 are allowed to commonly use the memory 402 in terms of time, thereby making it possible to share the memory 402. Thus, it becomes possible to use the memory 402 efficiently. Moreover, in the MPEG encoder 500, at least one portion of the connection terminal for receiving the access signal from the MPEG decoder 106 can be sharedly used as the connection terminal for transferring data between the MPEG encoder 500 and the outside thereof at the time of its encoding operation; thus, it becomes possible to reduce the number of the terminals of the MPEG encoders 500.

Moreover, in the case when the MPEG decoder 106 accesses the memory 402, at least one portion of the connection terminal for transferring data between the memory 402 and the MPEG decoder 106 can be sharedly used as the connection terminal for transferring data between the MPEG encoder 500 and the outside thereof at the time of its encoding operation; thus, it becomes possible to further reduce the number of the terminals.

Sixth Embodiment

Figure 9:
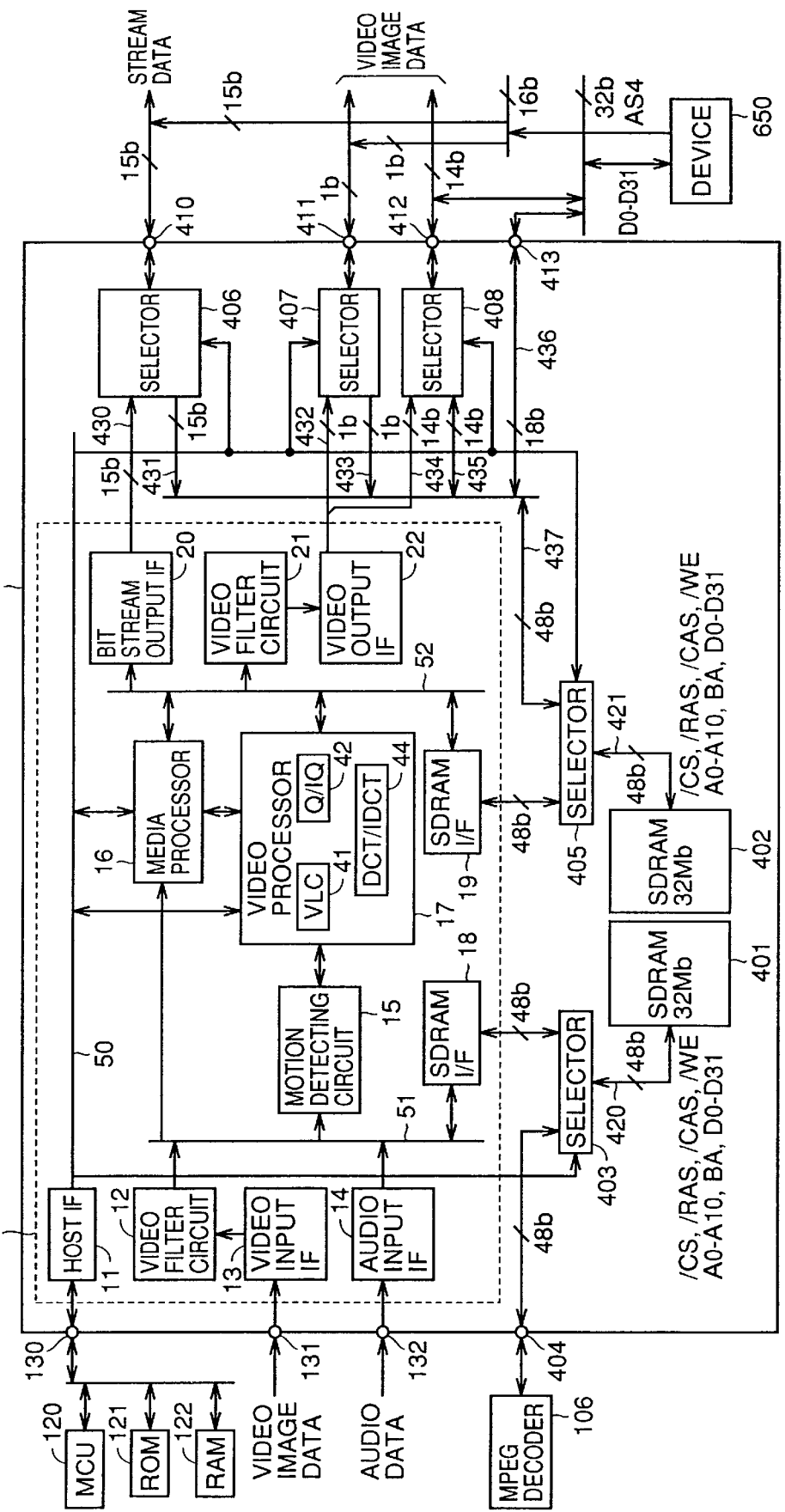
FIG. 9 is a block diagram that shows a detailed arrangement of an MPEG encoder in accordance with a sixth embodiment of the present invention.
Figure 10:
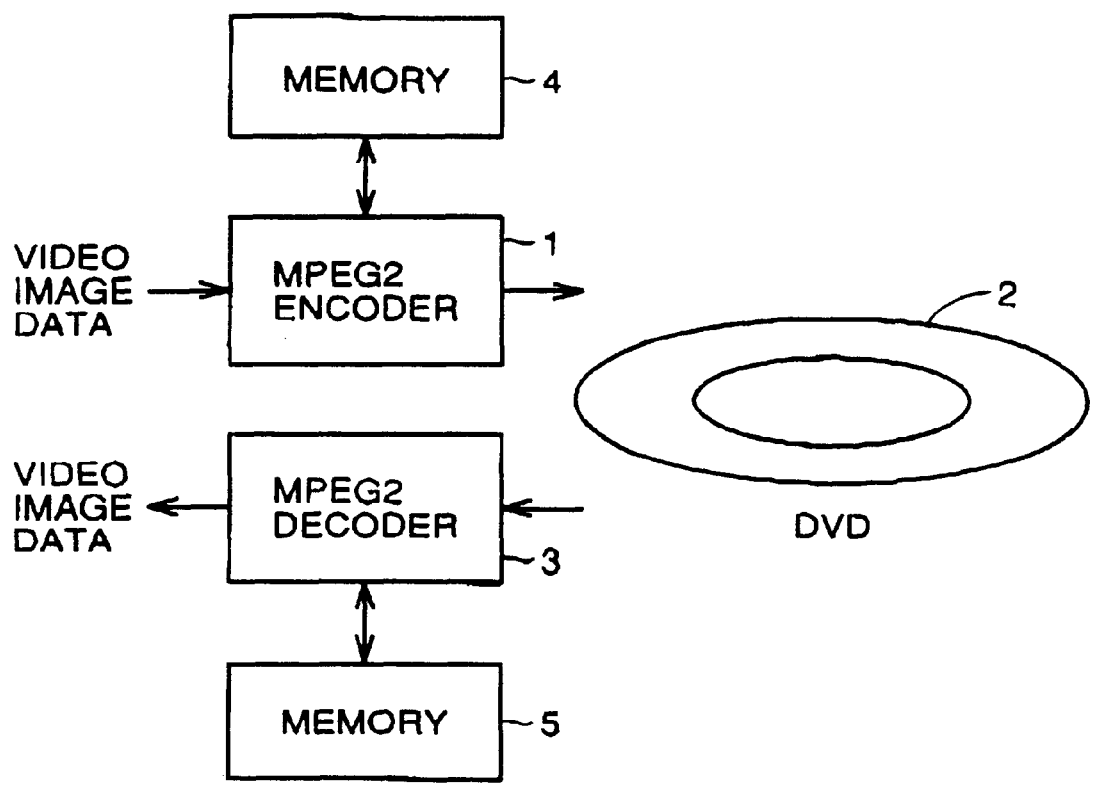
FIG. 10 is a block diagram that shows an arrangement of a conventional DVD decoder device.

FIG. 9 shows a detailed construction of an MPEG encoder 600 in accordance with the sixth embodiment of the present invention and the connecting relationship of the MPEG encoder 600 and the MPEG decoder 106.

The MPEG encoder 600 is provided with the selectors 405 to 408 and the terminals 410 to 413 in the same manner as in FIG. 8. The other arrangements are the same as those described in the MPEG encoder 400 of the fourth embodiment.

In the same manner as in the fourth embodiment, the connection mode of the selector 403 is switched so that the MPEG encoder 600 and the MPEG decoder 106 are allowed to commonly use the memory 401 in terms of time, thereby making it possible to share the memory 401. Moreover, in the case when a device 650 that becomes operative when the MPEG encoder 600 is not carrying out the encoding process is installed on the electronic system, the device 650 is allowed to use the memory 402. Here, the device 650 is constituted by a semiconductor chip different from the MPEG decoder 106.

More specifically, the total 16 connection pins of the terminals 410 and 411 are connected to the 16 connection pins of the device 650 for outputting an access signal AS4 for accessing the memory 402 in one-to-one correspondence with each other. The access signal AS4 consists of address signals of A0 to A10 signals, /CS signal, /RAS signal, /CAS signal, /WE signal and BA signal. The total 32 connection pins of the terminals 412 and 413 are connected to the 32 connection pins in the device 650 for transmitting and receiving data, in one-to-one correspondence with each other. Therefore, by switching the connection modes of the selectors 405 to 408 in the same manner as in the fifth embodiment, the device 650 is allowed to access the memory 402.

The electronic system of the present invention is not intended to be limited by the DVD recorders device shown in the above-mentioned the first embodiment through the sixth embodiment; and it may be also applied to an encode/decode processing system having an encoder for encoding data and a decoder for decoding the encoded data to the data having the original data format. It may also applied to a system provided with two functional blocks which are operated in different periods of time and access a memory upon processing respective pieces of data.

Moreover, the semiconductor integrated circuit device of the present invention is not intended to be limited to the above-mentioned MPEG encoder, and may be applied to a selector semiconductor integrated circuit device that is operated while being switched to another external device in terms of time, and has a built-in selector described in the above-mentioned embodiments so as to share the memory with the external device.

In accordance with the present invention, the semiconductor circuit device is provided with: a functional block for carrying out a predetermined data processing operation and for generating a first access signal for accessing a memory, an external interface terminal for receiving a second access signal for accessing the memory, and a first selector which has a first connection mode in which the functional block and the memory are electrically connected so as to supply the first access signal to the memory and a second connection mode in which the external interface terminal and the memory are electrically connected so as to supply the second access signal to the memory; therefore, it is possible to sharedly use the memory with another device connected to the external interface terminal. Consequently, it becomes possible to effectively use the memory.

In accordance with the present invention, the electronic system is provided with: a memory for storing data, a first functional block, formed on a single semiconductor chip, for carrying out a first data processing and for generating a first access signal used for accessing the memory; a second functional block, formed on another single semiconductor chip different from the first functional block, for carrying out a second data processing and for generating a second access signal used for accessing the memory; and a first selector which electrically connects the first functional block to the memory in a first connection mode so as to supply the first access signal to the memory, and which also electrically connects the second functional block to the memory in a second connection mode so as to supply the second access signal to the memory; therefore, the first and second functional blocks are allowed to access the common memory. Thus, it becomes possible to use the memory efficiently.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit device formed on a single semiconductor chip, comprising:
   a functional block for carrying out a predetermined data processing operation and for generating a first access signal for accessing a memory;
   an external interface terminal for receiving a second access signal for accessing the memory from exterior of the single semiconductor chip;
   a first selector having a first input for receiving the first access signal from said function block, a second input for receiving the second access signal from said external interface terminal, and an output connected to the memory, said first selector for selecting one of said first and second inputs and for electrically connecting the output to the selected input so as to provide the memory with the access signal received at the selected input through the output; and
   a second selector having a first electrode connected to said function block, a second electrode connected to said external interface terminal and a third electrode connected to the second input of said first selector, said second selector for electrically connecting the first electrode to the second electrode when said first selector selects the first input and for electrically connecting the third electrode to the second electrode when said first selector selects the second input.

2. The semiconductor integrated circuit device according to claim 1, wherein the memory is formed on the single semiconductor chip.

3. A semiconductor integrated circuit device, comprising:
   a functional block for carrying out a predetermined data processing operation and for generating a first access signal for accessing a memory;
   an external interface terminal for receiving a second access signal for accessing the memory;
   a first selector having a first connection mode for electrically connecting the functional block and the memory so as to supply the first access signal to the memory and a second connection mode for electrically connecting the external interface terminal and the memory so as to supply the second access signal to the memory;
   another external interface terminal for receiving a third access signal for accessing another memory; and
   another selector having a third connection mode for electrically connecting said another memory and said another external interface terminal so as to transfer the third access signal to said another memory and a fourth connection mode for electrically connecting the functional block and said another memory so as to transfer a fourth access signal, generated by the functional block, for accessing said another memory, to said another memory.

4. The semiconductor integrated circuit device according to claim 3, wherein the functional block, the first selector, and said another selector, the memory and said another memory are formed on a single semiconductor chip.

5. A semiconductor integrated circuit device, comprising:
   a functional block for carrying out a predetermined data processing operation and for generating a first access signal for accessing a memory;
   an external interface terminal for receiving a second access signal for accessing the memory;
   a first selector having a first connection mode for electrically connecting the functional block and the memory so as to supply the first access signal to the memory and a second connection mode for electrically connecting the external interface terminal and the memory so as to supply the second access signal to the memory;
   a second selector which, at the time of the first connection mode, electrically connects the functional block and the external interface, and which, at the time of the second connection mode, also electrically connects the first selector and the external interface terminal so as to supply one portion or all the portions of the second access signal to the first selector;
   another external interface terminal for receiving a third access signal for accessing another memory; and
   a third selector having a third connection mode for electrically connecting said another memory and said another external interface terminal so as to transfer the third access signal to said another memory and a fourth connection mode for electrically connecting the functional block and said another memory so as to transfer a fourth access signal, generated by the functional block, for accessing said another memory, to said another memory.

6. The semiconductor integrated circuit device according to claim 5, wherein the functional block, the first, second and third selectors, the memory and said another memory are formed on a single semiconductor chip.

7. An electronic system comprising:
   a memory for storing data;
   a first functional block, formed on a first semiconductor chip, for carrying out a first data processing and for generating a first access signal used for accessing the memory;

a second functional block, formed on a second semiconductor chip different from the first semiconductor chip, for carrying out a second data processing and for generating a second access signal used for accessing the memory;

a first selector formed on the first semiconductor chip and which electrically connects the first functional block to the memory in a first connection mode so as to supply the first access signal to the memory, and which also electrically connects the second functional block to the memory in a second connection mode so as to supply the second access signal to the memory;

a third functional block, formed on a third semiconductor chip different from the first and second functional blocks, for carrying out a third data processing operation while the first functional block is carrying out the first data processing operation;

a signal line connected to the second functional block and the third functional block; and a second selector, formed on the first semiconductor chip, which, at the time of the first connection mode, electrically connects the first functional block and the signal line, and which, at the time of the second connection mode, also electrically connects the first selector and the signal line so as to supply one portion or all the portions of the second access signal to the first selector.

* * * * *